United States Patent Office 2,878,237
Patented Mar. 17, 1959

2,878,237

MERCAPTO DIBASIC ACIDS AS REGULATORS FOR THE POLYMERIZATION OF ACRYLIC ACIDS, AMIDES AND SALTS

William Norman Russell, Stamford, and Tzeng Jiueq Suen, New Canaan, Conn., assignors to American Cyanamid Company, New York, N. Y., a corporation of Maine No Drawing. Application June 15, 1955
Serial No. 515,775

17 Claims. (Cl. 260—80)

This invention relates to a method of making water-soluble polymers in aqueous solutions. More particularly, this invention relates to the polymerization of acrylamide, acrylic acid, their methyl-substituted derivatives and salts of these acids with water-soluble mercapto compounds to form relatively low molecular weight water-soluble polymers.

The polymers of the present invention prepared by treating a monomeric material of the above-mentioned types with a mercapto dibasic acid or salt thereof, i. e., one containing two carboxyl groups and one thiol, or —SH group, find employment among other things as additives to paper, surface coating for paper, adhesives, sizing agents for textiles or leather treatment, and as modifiers of plastics. The type of polymer prepared according to the present invention in an aqueous medium using a mercapto dibasic acid as an agent to control the molecular weight of the polymer is considered greatly superior to prior methods of making polymers through other means. We have found that acrylamide, methacrylamide, acrylic acid, methacrylic acid and the salts of these acids may be polymerized in a simple operation permitting control of the extent of polymerization in a water solution. The process of the present invention is adaptable to both batch and continuous methods.

It is an object of our invention to polymerize acrylamide, acrylic acid, their methyl-substituted derivatives and their salts in an aqueous medium. It is a further object of our invention to control the molecular weight of these water-soluble polymers using water-soluble mercapto dibasic acids and salts thereof as agents to control the molecular weight of the polymer in reactions conducted in an aqeuous medium. These, and other objects of our invention, will be discussed more fully hereinbelow.

By the process of our invention, low molecular weight water-soluble polymers of acrylamide, acrylic acid, their α-substituted methyl derivatives, and salts of these acids are produced. The monomers contemplated by the present invention are those represented by the general formula

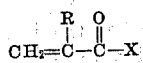

wherein R is H or $CH_3$ and X is $NH_2$, OH, ONa, OK, OLi, or $ONH_4$. When compounds represented by the above formula are polymerized in an aqueous medium with the mercapto dibasic acids or salts which contain from four to eight carbon atoms and one thiol grouping as molecular weight regulating agents, it has been found that good control of the degree of polymerization is possible. Included among the compounds contemplated by the instant invention as molecular weight regulating agents are mercaptosuccinic acid, α'-mercapto-α-methyl succinic acid, mercaptoglutaric acid, mercaptoadipic acid, mercaptopimelic acid and mercaptosuberic acid and the sodium, potassium, ammonium, etc., salts of these acids. The temperature employed in the reaction is not critical; and temperatures ranging from about 5° C. to about 100° C. may be employed, although from a practical standpoint temperatures from room temperature to reflux are preferably utilized. When pressure apparatus is employed, temperatures exceeding 100° C. may be used.

According to the invention, the polymerizable water-soluble organic compounds are dissolved in water together with the mercapto dibasic acid or salt thereof and thereafter are subjected to polymerizing conditions. The method of the present invention herein described is made with reference to batch methods, although the concept set forth is equally adaptable to both batch and continuous processes. While catalysts, temperatures, and reaction time, when taken individually, are not per se critical, a consideration of the interdependence of these factors is necessary in order to achieve optimum results. We have found that reaction time may vary from relatively short durations, for example as little as 15 minutes, to an indefinite period. Hence, depending on exigencies, use, economic factors, etc., any convenient upper time limit may be set by regulating the physical conditions, catalyst etc., during reaction. In general, the higher the temperature the shorter is the reaction time required. In achieving optimum results, suitable conditions may be employed in effecting and enhancing polymerization. Heat, and/or catalytic conditions of light or both heat and light with or without polymerization catalysts can be used. Ultra-violet light is more effective than ordinary light. It is also possible to effect polymerization as a result of gamma radiation as from cobalt 60, radium, or other high-energy or radioactive materials. A polymerization catalyst is preferably employed in order to shorten the period of time required for polymerization of the monomers of the present invention. The catalysts may be used alone or as a redox (reduction-oxidation) system with a water-soluble activator therefor. Among such catalysts are the inorganic peroxides, e. g., hydrogen peroxide, barium peroxide, and salts of inorganic per-acids, e. g., ammonium persulfate, sodium persulfate, potassium persulfate, sodium perborate, potassium perborate, etc. Examples of organic peroxide catalysts that can be employed are the following: urea peroxide, methyl ethyl ketone peroxide, benzoyl peroxide, ditertiary butyl peroxide, tertiary butyl hydroperoxide, 2,2-bis tertiary butyl peroxy butane, cumene hydroperoxide, and other oxidizing agents such as chlorates, permanganates, and the like.

For redox systems, reducing agents such as ferrous salt, alkali-bisulfite, alkali-thiosulfate, alkali-formaldehyde sulfoxylate, hydroxylamine, amines, amine salts and the like may be employed. Other so-called "free radical" types of catalyst, e. g., α,α'-azodiisobutylronitrile, also can be used to accelerate polymerization. The amount of catalyst used may be varied widely, depending, for example, upon the particular kind of catalyst used and upon the other polymerization conditions, and may range from about 0.01% to about 10% by weight or more by way of the total amount of monomer or its derivative employed. Although amounts in excess of 10% catalyst may be employed, no advantage is apparent in using such excess quantities. Generally, the amount of catalyst used is within the range of from about 0.1% to about 7% by weight of the total monomer.

The molecular weight regulating agent, through which control of the molecular weight of the polymers of the present invention is accomplished, is employed in amounts from about 0.5% to about 10%. We prefer to use between 1% and 7% based on the weight of the monomer. The molecular weight regulating agents which have been used to advantage according to the present invention and which, as previously indicated, are contemplated as falling within the scope of the invention are those organic mercapto dibasic acids and salts thereof containing one thiol (—SH) group and two carboxyl groups.

In the process of the instant invention, the addition of these mercapto dibasic acid compounds to the monomer in an aqueous medium, preferably in the presence of a catalyst, has particular applicability for the provision of relatively low molecular weight water-soluble polymers. Such polymers possess the advantages, among others, of greatly improved characteristics and a wider range of utility.

The process of the instant invention using the molecular weight regulating agents herein described has especially advantageous application for making water-soluble polymers in an aqueous medium, and particularly those polymers which have a molecular weight that ranges generally from about 5000 to 100,000. The molecular weight of the polymer formed depends on the amount of mercapto dibasic acid compound added. In general, the larger the amount of this agent, the lower is the molecular weight. Best results are obtained when a quantity of from about 1–7% of the molecular weight regulating agent, based on the weight of the monomer, is used. At lower concentrations, higher molecular weight products are obtained. At concentrations exceeding 10% no substantial advantage is apparent. It is thus seen that the invention has particular significance in polymerizing in an aqueous medium, and further, in the utilization of water-soluble mercapto dibasic acid agents to regulate or limit the molecular weight of the reaction product in water solutions.

The mercapto dibasic acid compounds when used in the stated proportions (about 0.5–10% based on the weight of the monomer) and at moderate temperatures and under atmospheric pressures provide a simple means for controlling the molecular weight of water soluble polymers.

The water soluble mercapto dibasic acid compounds containing a single thiol group and between four and eight carbon atoms, have the advantage of good water solubility and due to their low vapor pressure do not possess the objectionable odor which is normally present in ordinary mercapto compounds.

Although the polymerization reaction of the present invention may be carried out under normal atmospheric conditions, we prefer to use an inert atmosphere. Accordingly, for optimum conditions, a carbon dioxide or nitrogen atmosphere is maintained during the reaction.

Included among the monomeric compounds, contemplated as falling within the scope of the general formula, which may be utilized to form the relatively low molecular weight water-soluble polymers with the mercapto dibasic molecular weight regulating agents are: acrylic acid, methacrylic acid, acrylamide, methacrylamide, sodium acrylate, sodium methacrylate, potassium acrylate, potassium methacrylate, ammonium acrylate, ammonium methacrylate, lithium acrylate and lithium methacrylate.

In order that the present invention may be more fully understood, the following examples are given by way of illustration only and any specific enumeration of details should not be interpreted as a limitation unless so expressed in the appended claims. All parts are parts by weight unless otherwise indicated.

EXAMPLE I

Solution:

| | Parts |
|---|---|
| (a) Acrylamide | 4,000 |
| Mercaptosuccinic acid | 80 |
| Demineralized water | 2,500 |
| (b) Ammonium persulfate, stock | 120 |
| Demineralized water | 500 |
| (c) Potassium meta-bisulfite, stock | 60 |
| Demineralized water | 500 |
| (d) Demineralized water | 2,240 |

*Procedure.*—The water (d) is charged into a suitable stainless steel, glass, or glass-lined reactor equipped with thermometer, mechanical stirrer, gas inlet tube, reflux condenser and dropping funnels. Purging of the system with $CO_2$ is maintained throughout the preparation. The water is heated to 80° C. ±2° C. The acrylamide solution (a) is charged continuously over a period of about one hour [one-seventh of each of the catalyst solutions (b) and (c) was charged every 10 minutes during the hour] maintaining a temperature as above noted. The batch is further maintained at the above temperature for two hours and then cooled to room temperature. The product is in the form of a 40% solution having a Brookfield viscosity at 25° C. of about 2,000 centipoises. Its specific viscosity (1% in water, 25° C.) is 0.09 and its molecular weight is estimated at about 10,000 as determined through viscometric data related to previous ultra centrifuge measurements.

EXAMPLE II

Solution:

| | Parts by weight |
|---|---|
| (a) Acrylamide | 200 |
| Demineralized water | 200 |
| Mercaptosuccinic acid | 10 |
| (b) Ammonium persulfate | 10 |
| Demineralized water | 205 |
| (c) Demineralized water | 375 |

*Procedure.*—The water (c) was charged into a suitable reaction vessel fitted with a thermometer, mechanical stirrer, gas inlet tube, reflux condenser and dropping funnels. An inert gas atmosphere ($CO_2$) was maintained throughout the preparation. The water was heated to about 80° C. and solutions (a) and (b) were charged semicontinuously over a period of 30 minutes during which the batch temperature was maintained at 85°–95° C. The batch temperature is maintained at 80°–90° C. for an additional 120 minutes. The viscosity (Brookfield) of this material at 25° C. was 31 centipoises.

EXAMPLE III

The procedure of Example II was repeated except that the relative amount of mercaptosuccinic acid employed in solution (a) was four parts and a reaction temperature of between 90°–98° C. was employed.

The viscosity (Brookfield) of the resulting product at 25° C. was 111 centipoises.

EXAMPLE IV

Solution:

| | Parts by weight |
|---|---|
| (a) Acrylamide | 200 |
| Demineralized water | 200 |
| Mercaptosuccinic acid | 4 |
| (b) Potassium persulfate | 6.0 |
| Demineralized water | 150 |
| (c) Sodium metabisulfite | 3.0 |
| Demineralized water | 50 |
| (d) Demineralized water | 375 |

*Procedure.*—The water (d) is charged into a suitable reaction vessel fitted with a thermometer, mechanical stirrer, gas inlet tube, reflux condenser and dropping funnels. An inert gas atmosphere ($CO_2$) is maintained throughout the preparation. The water is heated to about 70° C. and solutions (a), (b) and (c) are then charged semicontinuously over a period of 30 minutes while the batch temperature maintained at 68°–78° C. The batch temperature is further maintained at 75°–2° C. for an additional 120 minutes.

The viscosity (Brookfield) of this material at 25° C. is 31 centipoises, and the specific viscosity (1% in water) is 0.2. The molecular weight of this material is estimated at about 24,000, as determined through viscometric data, based on ultra centrifuge measurements.

EXAMPLE V

Solution:                                          Parts by weight
(a) Acrylic acid, 53.2% in water ............ 470
    Mercaptosuccinic acid .................... 5
(b) Ammonium persulfate .................... 5.0
    Demineralized water ....................... 5.0
(c) Potassium metabisulfite ................. 2.5
    Demineralized water ....................... 75
(d) Demineralized water ....................... 400

*Procedure.*—Solution (d) was charged into a suitable reactor fitted with mechanical stirring, thermometer, reflux condenser, gas inlet tube, and addition funnels. Purging with an inert gas ($CO_2$) was begun and continued throughout the preparation. The water is heated to 70° C. Solutions (a), (b) and (c) are charged semi-continuously over a period of 20 minutes as the batch temperature is maintained at 70°–80° C. The batch is then maintained at 75°–80° C. for an additional 120 minutes and then cooled to room temperature.

The Brookfield viscosity of the product at 25° C. equals 28 centipoises. The weight average, molecular weight of this product was estimated at 8,000 based on viscometric measurement and ultra centrifuge data.

EXAMPLE VI

*Comparative example*

The procedure of Example I was repeated with the exception that mercaptosuccinic acid was not employed in solution (a). As the monomer and catalyst solutions (a, b and c) were being added, the batch thickened proportionately until after about 40 minutes of additions the batch gelled preventing further processing of the reactants.

We claim:

1. The method of making water-soluble polymers of monomeric compounds having the general formula:

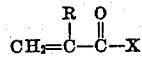

where R is a member of the group consisting of H and $CH_3$, and X is a member selected from the group consisting of $NH_2$, OH, ONa, OK, OLi and $ONH_4$, which comprises polymerizing said compound at a temperature of between about 5° C. and 100° C. in an aqueous solution in the presence of a water-soluble molecular weight regulating agent selected from the group consisting of mercapto dibasic acids and water soluble salts thereof containing from four to eight carbon atoms and one thiol group.

2. The method of making water-soluble polymer of monomeric compounds having the general formula:

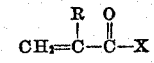

where R is a member of the group consisting of H and $CH_3$, and X is a member selected from the group consisting of $NH_2$, OH, ONa, OK, OLi and $ONH_4$, which comprises polymerizing said compound at a temperature of between about 5° C. and 100° C. in an aqueous solution in the presence of a catalyst and from 0.5–10%, based on the weight of said monomeric compound, of a water-soluble molecular weight regulating agent selected from the group consisting of mercapto dibasic acids and water-soluble salts thereof containing from four to eight carbon atoms and one thiol group.

3. The method of making water-soluble polymers of monomeric compounds of the general formula:

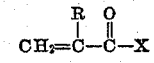

where R is a member of the group consisting of H and $CH_3$ and X is selected from the group consisting of $NH_2$, OH, ONa, OK, OLi, and $ONH_4$, which comprises polymerizing said monomer at a temperature of between about 5° C. and 100° C. with from 1–7% based on the weight of said monomeric compound of a water-soluble molecular weight regulating agent selected from the group consisting of water-soluble mercaptodibasic acids and water-soluble salts thereof containing one thiol group and from four to eight carbon atoms in an aqueous solution, and in the presence of a catalyst.

4. The method of claim 3 in which the monomeric compound is acrylamide.

5. The method of claim 3 in which the monomeric compound is acrylic acid.

6. The method of making water-soluble polymers of monomeric compounds having the general formula:

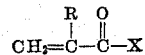

where R is a member of the group consisting of H and $CH_3$ and X is selected from the group consisting of $NH$, OH, ONa, OK, OLi, and $ONH_4$ which comprises polymerizing said monomeric compound with from about 1–7% based on the weight of said monomeric compound of mercaptosuccinic acid as a molecular weight regulating agent in an aqueous solution.

7. The method of claim 6 where the reaction is conducted under inert conditions.

8. The method of claim 6 in which the molecular weight regulating agent is α'-mercapto-α-methyl succinic acid.

9. The method of making water-soluble polymers of acrylamide which comprises polymerizing said acrylamide in an aqueous solution with from 0.5–10% based on the weight of acrylamide, of mercaptosuccinic acid as a molecular weight regulating agent.

10. The method of making water-soluble polymers of acrylamide which comprises polymerizing said acrylamide in an aqueous solution under catalytic conditions with from 1–7% based on the weight of acrylamide of mercaptosuccinic acid.

11. The method of claim 10 in which ammonium persulfate is employed as the catalyst and the polymerization is conducted under inert atmospheric conditions.

12. The method of making water-soluble polymers of acrylamide which comprises polymerizing said acrylamide in an aqueous solution in the presence of from 1–7% based on the weight of acrylamide of α'-mercapto-α-methyl succinic acid as a molecular weight regulating agent.

13. The method of making water-soluble polymers of acrylamide which comprises polymerizing said acrylamide in an inert atmosphere in the presence of from 1–7% based on the weight of the acrylamide of mercaptosuccinic acid as a molecular weight regulating agent and a persulfate-bisulfite catalyst.

14. The method of claim 3 in which the molecular weight regulating agent is mercaptoglutaric acid.

15. The method of claim 3 in which the molecular weight regulating agent is mercaptoadipic acid.

16. The method of claim 3 in which the molecular weight regulating agent is mercaptosuberic acid.

17. The method of claim 13 in which the molecular weight regulating agent is α'-mercapto-α-methyl succinic acid.

References Cited in the file of this patent

UNITED STATES PATENTS

| | | |
|---|---|---|
| 2,380,475 | Stewart | July 31, 1945 |
| 2,380,905 | Stewart | July 31, 1945 |
| 2,568,648 | McCool | Sept. 18, 1951 |

OTHER REFERENCES

Schildknecht: Polymer Processes, 1956, Interscience Pub., N. Y., N. Y. (pp. 150–147–152).